US 11,307,356 B2

(12) United States Patent
Suzuki et al.

(10) Patent No.: US 11,307,356 B2
(45) Date of Patent: Apr. 19, 2022

(54) OPTICAL MODULE (71) Applicants: NTT ELECTRONICS CORPORATION, Yokohama (JP); NIPPON TELEGRAPH AND TELEPHONE CORPORATION, Tokyo (JP)

(72) Inventors: Yuichi Suzuki, Yokohama (JP); Tomohiro Nakanishi, Yokohama (JP); Motoki Minami, Yokohama (JP); Hiroshi Tomita, Yokohama (JP); Motohaya Ishii, Yokohama (JP); Shuichiro Asakawa, Atsugi (JP); Shunichi Soma, Atsugi (JP)

(73) Assignees: NTT ELECTRONICS CORPORATION, Kanagawa (JP); NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 16/957,259

(22) PCT Filed: Dec. 19, 2018

(86) PCT No.: PCT/JP2018/046765
§ 371 (c)(1),
(2) Date: Jun. 23, 2020

(87) PCT Pub. No.: WO2019/135357
PCT Pub. Date: Jul. 11, 2019

(65) Prior Publication Data
US 2021/0003781 A1 Jan. 7, 2021

(30) Foreign Application Priority Data
Jan. 4, 2018 (JP) .............................. JP2018-000253

(51) Int. Cl.
G02B 6/30 (2006.01)
G02B 6/42 (2006.01)
G02B 6/44 (2006.01)

(52) U.S. Cl.
CPC ............. *G02B 6/30* (2013.01); *G02B 6/4219* (2013.01); *G02B 6/4253* (2013.01); *G02B 6/4266* (2013.01); *G02B 6/4439* (2013.01)

(58) Field of Classification Search
CPC ...... G02B 6/30; G02B 6/4219; G02B 6/4253; G02B 6/4266; G02B 6/4439
(Continued)

(56) References Cited

U.S. PATENT DOCUMENTS 5,029,969 A   7/1991  Seike et al.
5,133,040 A * 7/1992  Egner ................. G02B 6/3879
                                                            385/136
(Continued)

FOREIGN PATENT DOCUMENTS

CN   1042444 A   5/1990
CN   1567070 A   1/2005
(Continued)

OTHER PUBLICATIONS

International Search Report dated Jan. 22, 2019 from corresponding International PCT Patent Application PCT/JP2018/046765, 2 pages.
(Continued)

*Primary Examiner* — Jerry M Blevins
(74) *Attorney, Agent, or Firm* — Ohlandt, Greeley, Ruggiero and Perle, LLP (57) ABSTRACT

An optical module that has a structure ensuring reduction in size. The optical module has a structure where a part of a fiber block is protruded from a housing. By including a thin plate, this optical module can avoid entering of dust in the housing, allows a position shift of the fiber block due to a
(Continued)

mounting position error of an optical component in the housing, a position shift of an opening portion due to a dimensional error of the housing, or a displacement due to a temperature change, and can reduce the coupling loss due to the optical axis misalignment.

10 Claims, 7 Drawing Sheets

(58) Field of Classification Search
USPC .......................................................... 385/49
See application file for complete search history.

(56) References Cited

U.S. PATENT DOCUMENTS

| | | |
|---|---|---|
| 2004/0202434 A1 | 10/2004 | Tomita et al. |
| 2005/0053336 A1 | 3/2005 | Ito et al. |
| 2009/0086770 A1 | 4/2009 | Sugizaki et al. |

FOREIGN PATENT DOCUMENTS

| | | | |
|---|---|---|---|
| CN | 20263178 U | 12/2012 | |
| JP | 5-333248 | 12/1993 | |
| JP | 07-035953 | 2/1995 | |
| JP | 07035953 A * | 2/1995 | ............... G02B 6/42 |
| JP | H0735953 A | 2/1995 | |
| JP | 08286075 | 11/1996 | |
| JP | 2000121885 | 4/2000 | |
| JP | 2004309978 | 11/2004 | |
| JP | 2006126495 | 5/2006 | |
| JP | 2008058662 | 3/2008 | |
| JP | 2009139861 | 6/2009 | |
| JP | 2010072534 | 4/2010 | |
| JP | 2011210957 | 10/2011 | |

OTHER PUBLICATIONS

First Office Action dated Oct. 30, 2018 from priority Japanese Patent Application No. 2018-000253, 13 pages.
Final Office Action dated Apr. 16, 2019 from priority Japanese Patent Application No. 2018-000253, 14 pages.
Chinese Office Action dated Nov. 26, 2021 for Chinese Appl. No. 201880085057.2.

* cited by examiner

OPTICAL MODULE

BACKGROUND

1. Field of the Disclosure

The present disclosure relates to an optical module used for optical communications.

2. Discussion of the Background Art

To couple an optical component, such as an optical waveguide chip, to an optical fiber, an optical module in which the optical component is disposed inside a housing and an optical fiber introduced from outside the housing is connected to the optical component at the inside of the housing is employed (see, for example, Patent Documents 1 and 2).

Patent Document 1: JP-A-08-286075
Patent Document 2: JP-A-2004-309978
Patent Document 3: JP-A-2009-139861

Usually, when the optical fiber is connected to the optical component, an optical element (fiber block) disclosed in Patent Document 3 is used. The optical modules of Patent Documents 1 and 2 house the optical components including the fiber blocks inside the housings to protect from a temperature change and an impact. In such a configuration, there is a problem that even if the optical component is downsized, it is difficult to reduce a size of the optical module due to the existence of the fiber block.

Therefore, to solve the above-described problem, the present disclosure has an object to provide an optical module that has a structure ensuring reduction in size.

SUMMARY

To achieve the above-described object, the optical module according to the present disclosure has a structure where a part of a fiber block is protruded from a housing.

Specifically, the optical module according to the present disclosure is an optical module that includes:

a housing that has an opening portion;

an optical component disposed inside the housing; and a fiber block that holds one end of an optical fiber outside the housing, the fiber block physically connecting the one end of the optical fiber to a light input/output end of the optical component via the opening portion of the housing, wherein a gap is provided between the opening portion and the fiber block, and a part of the fiber block on the optical fiber side is outside the housing.

This optical module can reduce a size of the optical module by disposing a part of the fiber block to protrude to the outside of the housing. Accordingly, the disclosure can provide an optical module that has a structure ensuring reduction in size.

In a case of such a structure, the reliability needs to be maintained by avoiding entering of a foreign object, such as dust, in the housing from the gap. Therefore, the present disclosure further includes a mask that covers the gap between the opening portion of the housing and the fiber block. As one example, the mask is a thin plate that has an opening smaller than the opening portion of the housing, and the opening causes the fiber block to pass through. As another example, the mask is a grease.

When the optical fiber connected to this module is bent, a load (bending moment) applied to the fiber block needs to be reduced to reduce a force applied to a connecting portion of the optical component and the fiber block. Therefore, the present disclosure is characterized by that the optical fiber held by the fiber block is a small-diameter fiber whose diameter is smaller than 125 μm. By using the small-diameter fiber, the optical fiber is easily bent, and the bending moment can be reduced. That is, by employing the small-diameter fiber, the force applied to the connecting portion of the optical component and the fiber block can be reduced. Specifically, by employing the small-diameter fiber, when the optical fiber is bent with a radius 10 mm, the force applied to the connecting portion of the optical component and the fiber block can be reduced by 50% or more compared with a case of employing an ordinary optical fiber (125 μm in diameter).

Since the fiber block protrudes outside the housing in this module, by moving the optical module or by a movement of the optical fiber, a large force is possibly applied to a fiber block base part of the optical fiber to damage it. Therefore, the present disclosure further includes a reinforcing material on an end surface of the fiber block on an opposite side of a connection surface with the light input/output end of the optical component, and the reinforcing material restricts the movement of the optical fiber. For example, the reinforcing material is an elastic adhesive that covers the optical fiber and adheres to the end surface of the fiber block (an elongation at break is 100% or more and a hardness (Shore A) is 80 or less, preferably the elongation at break is 200% or more and the hardness (Shore A) is 60 or less), a boot bonded to the end surface of the fiber block and penetrated by the optical fiber, or a heat shrinkable tube bonded to the end surface of the fiber block by the elastic adhesive and penetrated by the optical fiber. Thus, since the reinforcing material restricts the movement of the optical fiber at the fiber block base, the damage of the optical fiber can be avoided. By disposing the reinforcing material, a proof stress is improved by 500% or more in a side pull test (optical fiber tensile test) compared with a case without the reinforcing material.

The above-described respective disclosures can be combined wherever possible.

Effects of the Disclosure

The present disclosure can provide the optical module that has the structure ensuring the reduction in size.

BRIEF DESCRIPTION OF THE DRAWINGS

is a side view where the side surface of the housing is omitted, and (c) is a front view.

DETAILED DESCRIPTION OF THE PREFERRED EMBODIMENT

Embodiments of the present disclosure will be described by referring to the accompanying drawings. The embodiments described below are working examples of the present disclosure, and the present disclosure is not limited to the following embodiments. In this Description and the drawings, components having the identical reference numerals mutually denote the identical components.

Embodiment 1

Figure 2:
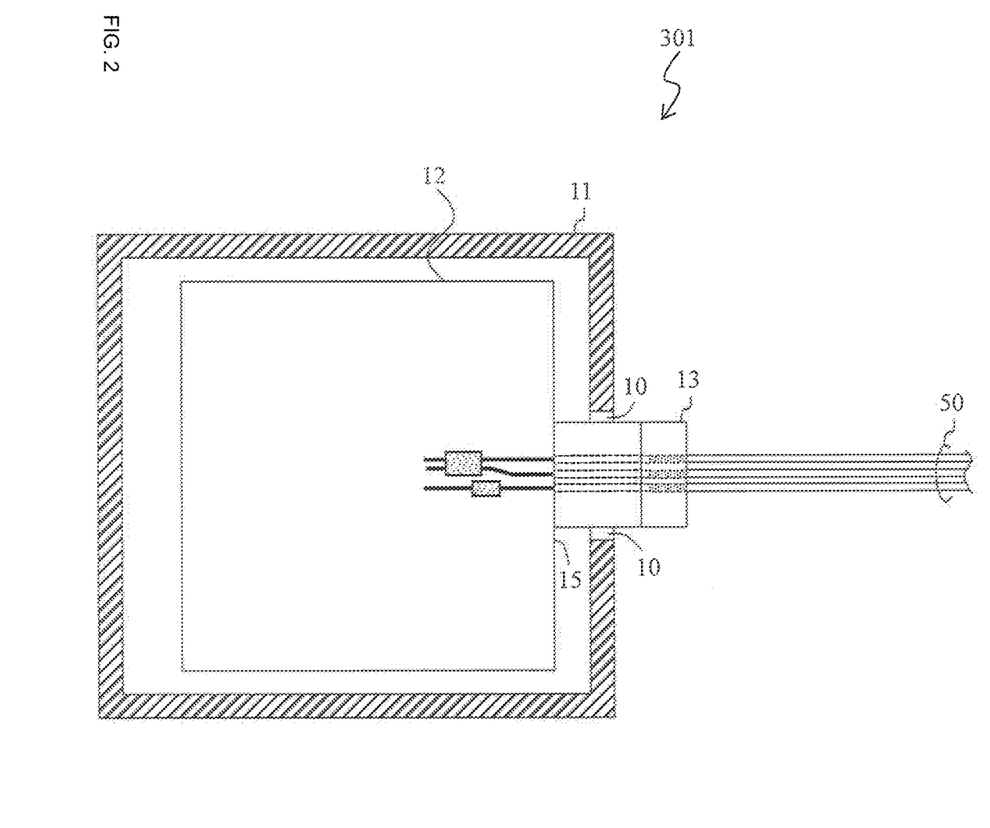
FIG. 2 is a drawing describing a structure of an optical module according to the present disclosure (drawing where a top surface of a housing is omitted).

FIG. 2 is a drawing describing an optical module 301 according to the present disclosure. The optical module 301 is an optical module that includes: a housing 11 that has an opening portion 10;

an optical component 12 disposed inside the housing 11; and a fiber block 13 that holds one end of an optical fiber 50 outside the housing 11, and physically connects the one end of the optical fiber 50 to a light input/output end 15 of the optical component 12 via the opening portion 10 of the housing 11, and a gap is provided between the opening portion 10 and the fiber block 13, and a part of the fiber block 13 on the optical fiber 50 side is outside the housing 11.

Note that while a case where the three optical fibers 50 are parallel will be described in this Description, the number of the optical fibers 50 is not limited to three. The optical module 301 is a type where the optical component 12 is in close contact with the fiber block 13, and an optical signal propagating in the optical fiber 50 directly enters an waveguide of the optical component 12 or an optical signal of the waveguide of the optical component 12 directly enters the optical fiber 50. The same applies to the optical module described in the following embodiments.

Figure 1:
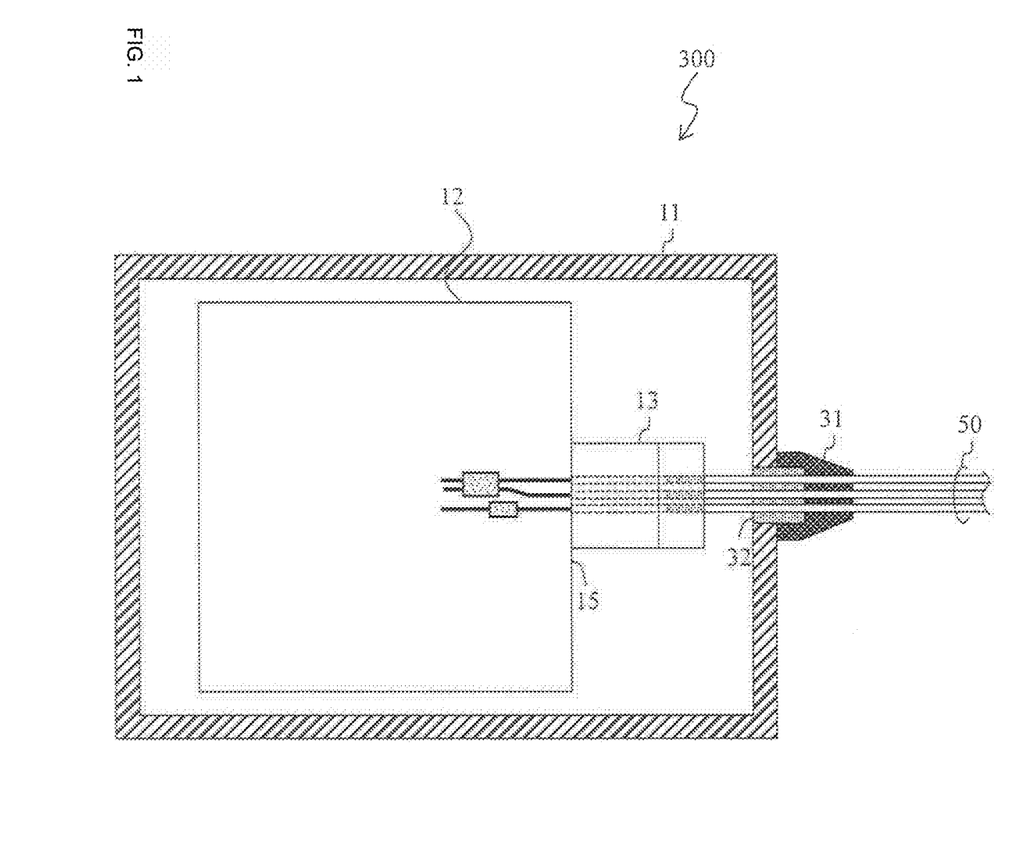
FIG. 1 is a drawing describing a structure of a conventional optical module (drawing where a top surface of a housing is omitted).

FIG. 1 is a drawing describing a conventional optical module 300. In the optical module 300, the optical component 12 and the fiber block 13 are disposed inside the housing 11. In the optical module 300, as described in Patent Documents 1 and 2, the optical fiber 50 is secured to the housing 11. In the optical module 300, because of the structure where the fiber block 13 is completely housed in the housing 11, the housing 11 could not be downsized.

Therefore, in the optical module 301, the housing 11 is downsized by forming the opening portion 10 to the housing 11 and disposing a part of the fiber block 13 to protrude from the opening portion 10. The housing 11 can be downsized up to an extent of contacting the optical component 12 at maximum. For example, assuming that the sizes of the optical component 12 and the fiber block 13 are same, the optical module 301 can be downsized by 20 percent or more by volume ratio compared with the optical module 300.

Embodiment 2

Figure 3:
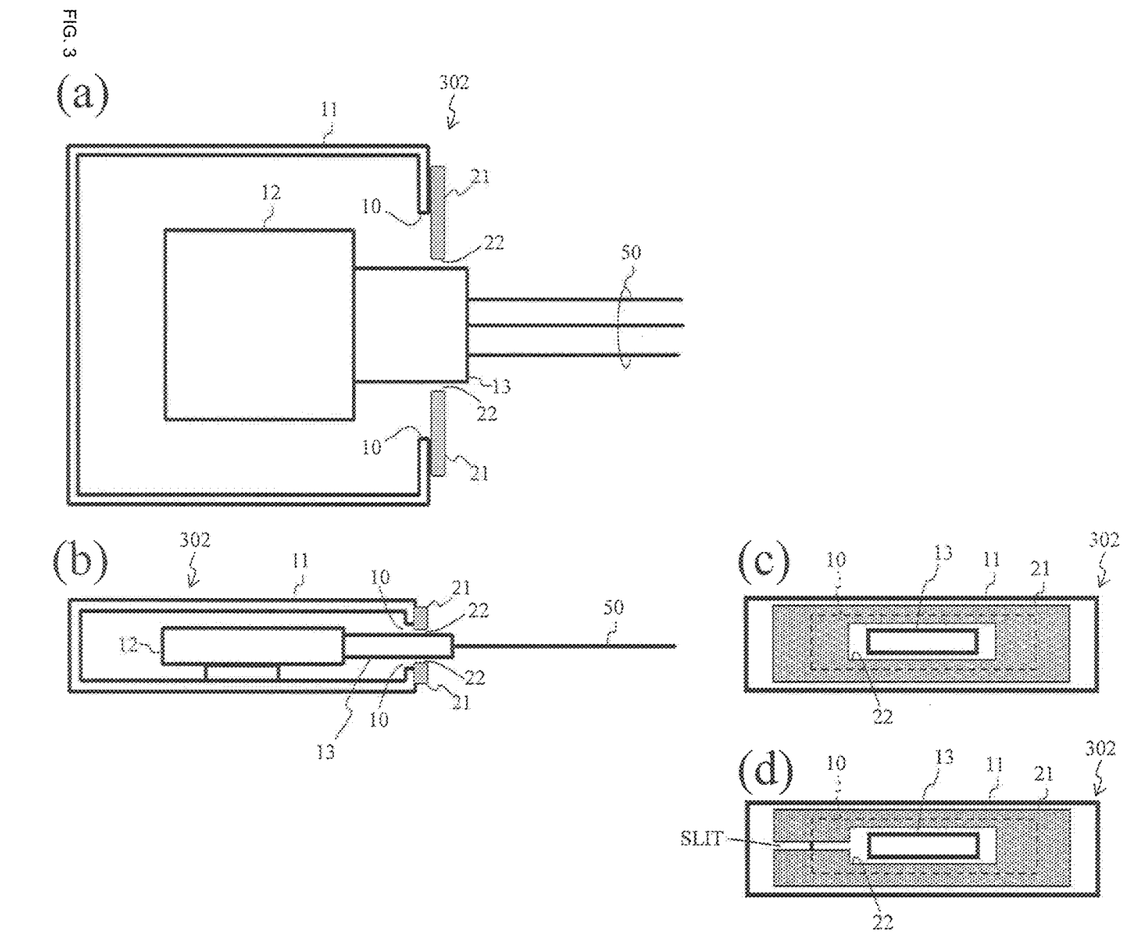
FIG. 3 includes drawings describing the structure of the optical module according to the present disclosure. (a) is a top view where the top surface of the housing is omitted, (b) is a side view where a side surface of the housing is omitted, and (c) is a front view. (d) is a drawing describing another configuration of a thin plate.

FIG. 3 is a trihedral figure describing an optical module 302 according to the present disclosure. The optical module 302 further includes a mask that covers a gap between the opening portion 10 of the housing 11 and the fiber block 13. Specifically, the mask of the optical module 302 is a thin plate 21 that causes the fiber block 13 to pass through and has an opening 22 smaller than the opening portion 10 of the housing 11.

When a dust enters the housing 11 from the gap between the opening portion 10 of the housing 11 and the fiber block 13, ensuring reliability of the optical component 12 becomes difficult. To decrease this gap as much as possible, it is also considered to make the size of the opening portion 10 slightly larger than a cross-sectional surface (outer dimension of a surface perpendicular to a longitudinal direction of the optical fiber 50) of the fiber block. However, because of a position shift of the fiber block 13 due to a mounting position error of the optical component 12 in the housing 11, a position shift of the opening portion 10 due to a dimensional error of the housing 11, or a displacement (shift or displacement in a direction perpendicular to the longitudinal direction of the optical fiber 50) due to a temperature change, decreasing this gap causes the fiber block 13 to contact the opening portion 10 in some cases. When the fiber block 13 contacts the opening portion 10, a force is applied to a connecting portion of the fiber block 13 and the optical component 12 to generate a misalignment between the light input/output end 15 and an end portion of the optical fiber 50, thereby causing a coupling loss due to an optical axis misalignment. Accordingly, decreasing the gap between the opening portion 10 and the fiber block 13 has a limitation.

Therefore, in the optical module 302, instead of decreasing the gap between the opening portion 10 and the fiber block 13, the thin plate 21 is attached to the opening portion 10 of the housing 11 to cover the gap. The size of the opening 22 is slightly larger than the cross-sectional surface of the fiber block 13. Specifically, a gap between the opening 22 and the fiber block 13 is set to 0 μm or more and 200 μm or less.

After assembling the optical module 302, the position of the thin plate 21 can be adjusted so as not to contact the fiber block 13. By using a reversible material for the thin plate 21, the thin plate 21 deforms even if the fiber block 13 contacts the thin plate 21, thereby reducing the force applied to the connecting portion of the fiber block 13 and the optical component 12. Therefore, the coupling loss due to the optical axis misalignment can be reduced. For example, the material of the thin plate 21 is a metal, such as SUS, or a plastic, such as a polyimide and an engineering plastic.

By providing a slit 23 to the thin plate 21 as illustrated in FIG. 3 (d), the thin plate 21 into which the optical fiber 50 is inserted can be easily attached to the opening portion 10 after assembling the optical module.

By including the thin plate 21, the optical module 302 can avoid the entering of the dust in the housing 11, and allow the position shift of the fiber block 13 due to the mounting position error of the optical component 12 in the housing 11, the position shift of the opening portion 10 due to the dimensional error of the housing 11, or the displacement due to the temperature change, thereby ensuring the reduction of the coupling loss due to the optical axis misalignment.

Embodiment 3

Figure 4:
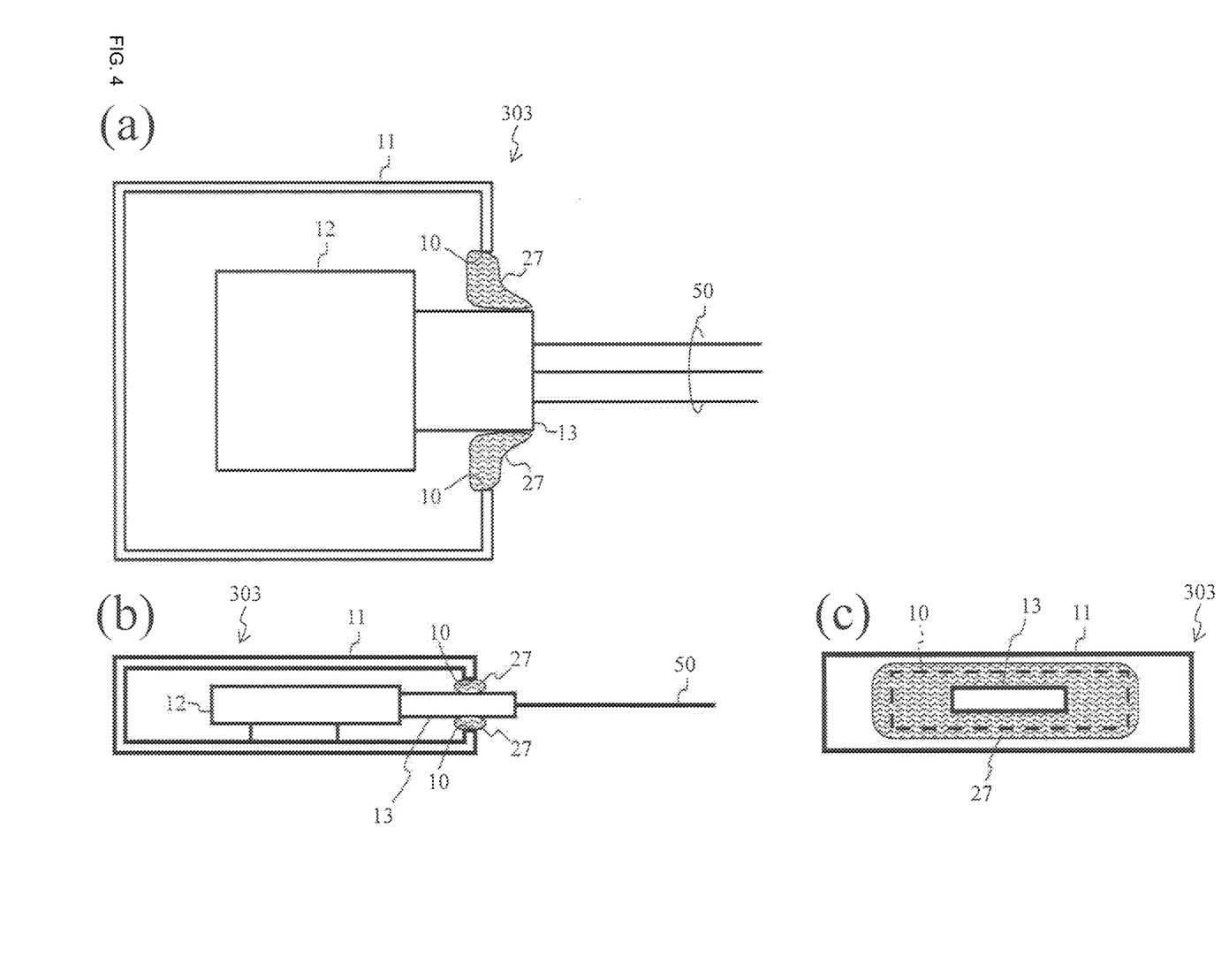
FIG. 4 includes drawings describing the structure of the optical module according to the present disclosure. (a) is a top view where the top surface of the housing is omitted, (b)

While the gap between the opening portion 10 of the housing 11 and the fiber block 13 is covered with the thin plate 21 in the embodiment 2, this gap may be covered with another material. FIG. 4 is a trihedral figure describing an optical module 303 according to the present disclosure. The mask of the optical module 303 is a grease 27. This gap is covered with the grease 27.

A thickener of the grease 27 has a heat resistance of 100° C. or more, and is preferably a material that does not harden, for example, a lithium type, a lithium complex type, an aluminum complex type, an urea type, and a PTFE type, which have consistencies of less than 350. A base oil of the grease 27 is preferably a silicone oil, a synthetic hydrocarbon oil, or a fluorine-based synthetic oil, which has an oil separation degree of less than 0.5%.

Since an elastic adhesive generates a thermal stress, the elastic adhesive is unsuitable for the material to cover this gap.

Since such a grease 27 does not generate the thermal stress, the effect as described in the embodiment 2 can be provided by covering this gap. That is, by including the grease 27, the optical module 303 can avoid the entering of the dust in the housing 11, and allow the position shift of the fiber block 13 due to the mounting position error of the optical component 12 in the housing 11, the position shift of the opening portion 10 due to the dimensional error of the housing 11, or the displacement due to the temperature change, thereby ensuring the reduction of the coupling loss due to the optical axis misalignment.

Embodiment 4

In the optical module according to the present disclosure, different from the optical modules of Patent Documents 1 and 2, the optical fiber is not secured to the housing. Therefore, a large force is applied to the connecting portion of the fiber block and the optical component depending on the handling of the optical module and the wiring (bending state) of the optical fiber, thereby generating the coupling loss due to the optical axis misalignment in some cases. Accordingly, the optical module according to the present disclosure takes the following measure.

Figure 5:
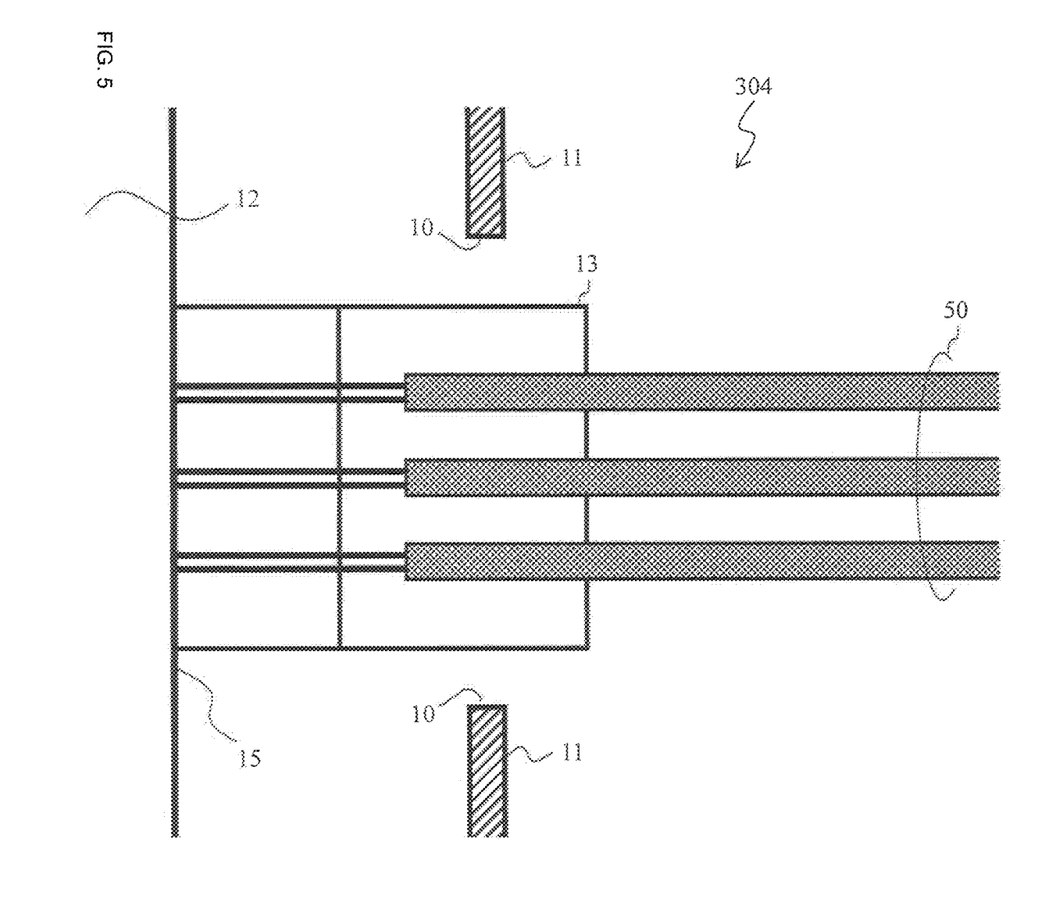
FIG. 5 is a drawing describing a fiber block part of the optical module according to the present disclosure.

FIG. 5 is a drawing describing an optical module 304 according to the present disclosure. The optical module 304 is characterized by that the optical fiber 50 held by the fiber block 13 is a small-diameter fiber whose diameter is smaller than 125 µm. For example, the optical fiber 50 is preferably a small-diameter fiber where a fiber diameter is 80 µm and an optical fiber diameter including a coating is less than 180 µm.

In an ordinary optical fiber, a fiber diameter is 125 µm and an optical fiber diameter including a coating is 250 µm. The small-diameter fiber is easily bent compared with the ordinary optical fiber, and the bending moment is small. That is, by using the small-diameter fiber for the optical fiber 50 held by the fiber block 13, even when a prescribed bending is given to the optical fiber 50, the force applied to the connecting portion of the fiber block 13 and the optical component 12 can be decreased compared with the case where the ordinary optical fiber is used. That is, the coupling loss due to the optical axis misalignment caused by bending the optical fiber can be reduced.

Accordingly, the optical module 304 can reduce the coupling loss caused by the handling and the wiring of the optical fiber 50.

Embodiment 5

In the optical module according to the present disclosure, different from the optical modules of Patent Documents 1 and 2, the optical fiber is not secured to the housing. Therefore, a large force is applied to a base of the fiber block of the optical fiber to damage the optical fiber in some cases depending on the handling of the optical module and the wiring (bending state) of the optical fiber. Accordingly, the optical module according to the present disclosure takes the following measure. Note that the base of the fiber block of the optical fiber means a portion closest to the fiber block in the portions of the optical fiber not held by the fiber block.

Figure 6:
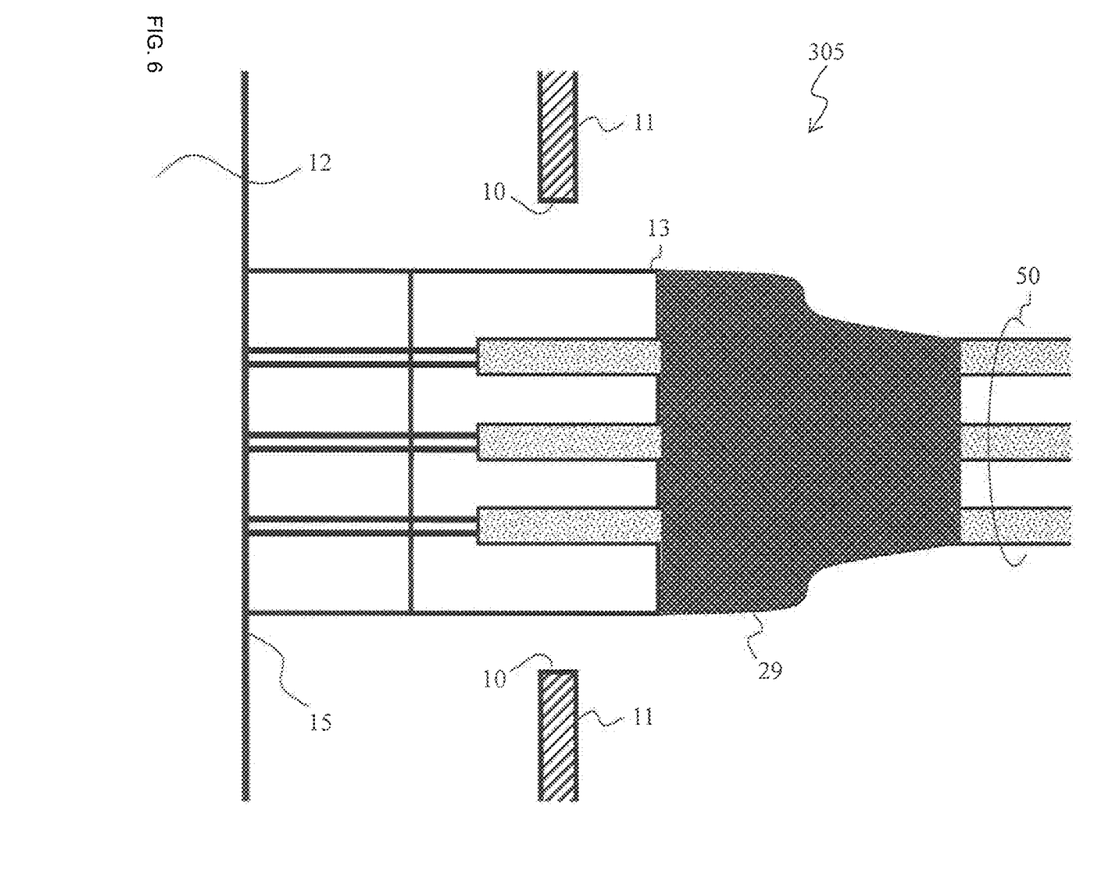
FIG. 6 is a drawing describing the fiber block part of the optical module according to the present disclosure.
Figure 7:
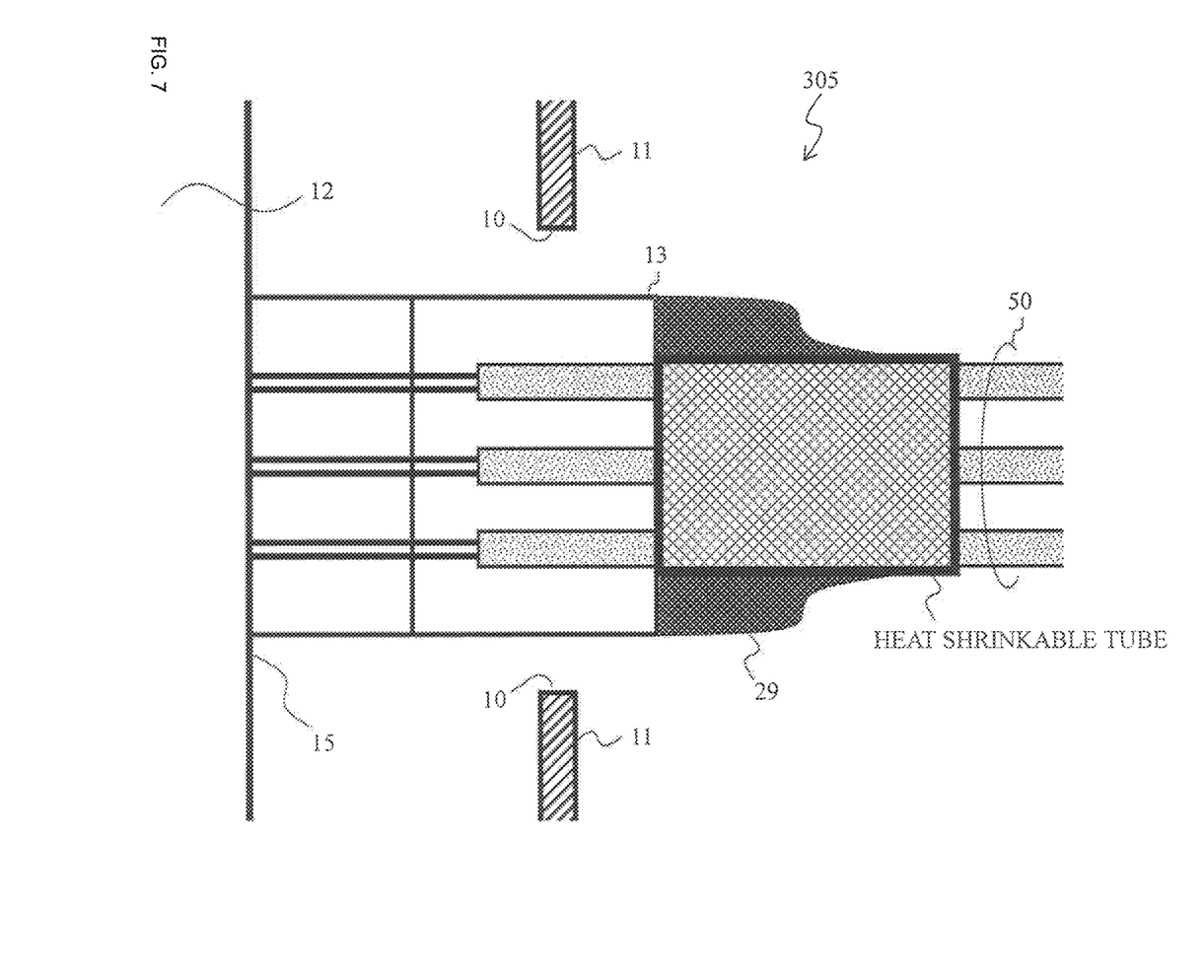
FIG. 7 is a drawing describing the fiber block part of the optical module according to the present disclosure.

FIG. 6 is a drawing describing an optical module 305 according to the present disclosure. The optical module 305 further includes a reinforcing material 29 that restricts a movement of the optical fiber 50 on an end surface of the fiber block 13 on an opposite side of a connection surface with the light input/output end 15 of the optical component 12. For example, the reinforcing material 29 is an elastic adhesive that covers the optical fiber 50 and adheres to the end surface of the fiber block 13. Not only a flexibility (hardness) but also an elongation (elongation at break) is important for this elastic adhesive so as not to be peeled off when the optical fiber is bent, and the elongation at break of 100% or more and the hardness (Shore A) of 80 or less, preferably the elongation at break of 200% or more and the hardness (Shore A) of 60 or less are required. Such an elastic adhesive can be an exemplified by DOW CORNING (registered trademark) SE 9186. The reinforcing material 29 is a boot bonded to the end surface of the fiber block 13 and penetrated by the optical fiber 50. As illustrated in FIG. 7, the reinforcing material 29 may be a heat shrinkable tube bonded to the end surface of the fiber block 13 by the elastic adhesive and penetrated by the optical fiber 50. The material of the heat shrinkable tube can be an exemplified by a polyimide and a silicone.

The optical module 305 protects the optical fiber 50 with the reinforcing material 29 at the base of the fiber block 13, and the force applied to the optical fiber at the base of the fiber block 13 can be decreased compared with a case without the reinforcing material even when the prescribed bending is given to the optical fiber 50. That is, the damage of the optical fiber due to the bending of the optical fiber can be reduced. Accordingly, the reinforcing material 29 can improve the ease of handling of the optical module 305.

Difference from Prior Art

While Patent Document 2 also has the object to reduce the size of the optical module, the structure to hold the optical fiber with a rubber boot (structure where the bending moment is not applied to the fiber block) is employed. Meanwhile, the optical module according to the present disclosure employs the configuration where the fiber block 13 is not held but exposed from the housing 11. The optical module of Patent Document 2 allows the position error of the fiber block at the manufacturing and the change of the housing due to the temperature variation in the optical axis direction (fiber longitudinal direction), but does not consider in the direction perpendicular to the optical axis direction. The optical module according to the present disclosure allows the position error of the fiber block 13 also in the direction perpendicular to the optical axis with the configuration that covers the gap with the mask. The optical module according to the present disclosure has the premise that the bending moment is applied to the fiber block 13 by the bending of the optical fiber 50, and employs the base reinforcement and the use of the small-diameter fiber.

DESCRIPTION OF REFERENCE SIGNS

10 Opening portion
11 Housing

12 Optical component
13 Fiber block
15 Light input/output end
21 Thin plate
22 Opening
27 Grease
29 Reinforcing material
31 Boot
32 Fiber fixture
50 Optical fiber
300 to 305 Optical module

The invention claimed is:

1. An optical module comprising:
a housing that has an opening portion;
an optical component disposed inside the housing; and
a fiber block that holds one end of an optical fiber outside the housing, the fiber block physically connecting the one end of the optical fiber to a light input/output end of the optical component via the opening portion of the housing, wherein
the optical component is in direct contact with the fiber block,
the housing and the fiber block are displaced from one another by a gap between the opening portion and the fiber block,
the fiber block is moveable in the gap in a direction that is perpendicular to an optical axis of the optical fiber, and
a part of the fiber block on the optical fiber side is outside the housing.

2. The optical module according to claim 1, further comprising a mask that covers the gap between the opening portion of the housing and the fiber block while allowing displacement between the housing and the fiber gap.

3. The optical module according to claim 2, wherein the mask is a thin plate that has an opening smaller than the opening portion of the housing, and the opening causes the fiber block to pass through.

4. The optical module according to claim 2, wherein the mask is a grease.

5. The optical module according to claim 1, wherein the optical fiber held by the fiber block is a small-diameter fiber whose diameter is smaller than 125 µm.

6. The optical module according to claim 1, further comprising a reinforcing material on an end surface of the fiber block on an opposite side of a connection surface with the light input/output end of the optical component, and the reinforcing material restricting a movement of the optical fiber.

7. The optical module according to claim 6, wherein the reinforcing material is an elastic adhesive that covers the optical fiber and adheres to the end surface of the fiber block, and an elongation at break of the elastic adhesive is 100% or more and a hardness (Shore A) is 80 or less.

8. The optical module according to claim 6, wherein the reinforcing material is a boot bonded to the end surface of the fiber block and penetrated by the optical fiber.

9. The optical module according to claim 6, wherein the reinforcing material is a heat shrinkable tube bonded to the end surface of the fiber block by an elastic adhesive and penetrated by the optical fiber.

10. The optical module according to claim 6, wherein the optical fiber held by the fiber block is a small-diameter fiber whose diameter is smaller than 125 µm.

* * * * *